United States Patent
Numakura

(10) Patent No.: US 12,397,849 B2
(45) Date of Patent: Aug. 26, 2025

(54) STEERING OPERATION INPUT APPARATUS

(71) Applicant: Hitachi Astemo, Ltd., Hitachinaka (JP)

(72) Inventor: Koji Numakura, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/724,061

(22) PCT Filed: Jan. 20, 2023

(86) PCT No.: PCT/JP2023/001740
§ 371 (c)(1),
(2) Date: Jun. 25, 2024

(87) PCT Pub. No.: WO2023/153178
PCT Pub. Date: Aug. 17, 2023

(65) Prior Publication Data
US 2025/0058819 A1 Feb. 20, 2025

(30) Foreign Application Priority Data
Feb. 14, 2022 (JP) .................................. 2022-020455

(51) Int. Cl.
*B62D 5/04* (2006.01)
(52) U.S. Cl.
CPC .............. *B62D 5/04* (2013.01); *B62D 5/0409* (2013.01)
(58) Field of Classification Search
CPC ................................ B62D 5/04; B62D 5/0409
See application file for complete search history.

(56) References Cited

U.S. PATENT DOCUMENTS 2,417,434 A * 3/1947 Mead .................. F16H 25/2015
74/89.37
5,732,790 A * 3/1998 Endo .................... B62D 5/0406
180/444
(Continued)

FOREIGN PATENT DOCUMENTS

JP H0911926 A * 1/1997
JP 4876739 2/2012
(Continued)

OTHER PUBLICATIONS

International Search Report issued Apr. 11, 2023 in International Application No. PCT/JP2023/001740, with English translation.
(Continued)

*Primary Examiner* — Laura Freedman
(74) *Attorney, Agent, or Firm* — Wenderoth, Lind & Ponack, L.L.P.

(57) ABSTRACT

A steering operation input apparatus is for allowing a predetermined neutral position to be acquired regardless of a direction in which a nut is mounted. In a mechanical stopper mechanism, a central position of the nut in an axial direction aligns with a central position of a crest and a central position of a root of an externally threaded portion with a steering wheel in a neutral state. A first imaginary line extends in a direction perpendicular to a rotational axis and passes through the crest and the root, and a second imaginary line extends perpendicularly to the first imaginary line on a line of the rotational axis in a cross section perpendicular to the rotational axis at the central position of the nut, and a pin is symmetric about the first imaginary line and asymmetric about the second imaginary line.

12 Claims, 12 Drawing Sheets

(56) References Cited

U.S. PATENT DOCUMENTS

| | | | | |
|---|---|---|---|---|
| 6,729,433 B2* | 5/2004 | Uryu | ............... | B62D 5/0406 |
| | | | | 310/71 |
| 8,657,062 B2* | 2/2014 | Tashiro | ............ | B62D 5/003 |
| | | | | 180/443 |
| 8,662,240 B2* | 3/2014 | Higashi | ......... | B62D 15/0215 |
| | | | | 180/402 |
| 8,720,639 B2* | 5/2014 | Froehlich | ......... | F16C 25/083 |
| | | | | 180/444 |
| 8,831,835 B2* | 9/2014 | Yoshimoto | ......... | B62D 5/001 |
| | | | | 701/41 |
| 10,895,278 B2* | 1/2021 | Kim | ................. | F16B 39/124 |
| 11,204,082 B2* | 12/2021 | Bonkowski | ....... | B62D 5/001 |
| 12,037,056 B2* | 7/2024 | Kim | ............... | B62D 5/0445 |

FOREIGN PATENT DOCUMENTS

| | | | |
|---|---|---|---|
| JP | 2013252804 A | * | 12/2013 |
| JP | 2019151152 A | * | 9/2019 |

OTHER PUBLICATIONS

Written Opinion of the International Searching Authority issued Apr. 11, 2023 in International Application No. PCT/JP2023/001740, with English translation.

\* cited by examiner

STEERING OPERATION INPUT APPARATUS

CROSS-REFERENCE TO RELATED APPLICATION

The present application claims priority under the Paris Convention to Japanese Patent Application No. 2022-020455 filed on Feb. 14, 2022. The entire disclosure of Japanese Patent Application No. 2022-020455 including the specification, the claims, the drawings, and the abstract is incorporated herein by reference in its entirety.

TECHNICAL FIELD

The present invention relates to a steering operation input apparatus.

BACKGROUND ART

Japanese Patent No. 4876739 discloses a steering apparatus in which a steering operation input apparatus includes a mechanical stopper mechanism that restricts an operation rotational amount of a steering wheel. The mechanical stopper mechanism includes a nut axially movable in conjunction with the rotation of the steering wheel. When the operation rotational amount of the steering wheel reaches a preset limit operation rotational amount, the nut is brought into abutment with an upper or lower stopper portion, and the operation rotational amount of the steering wheel is restricted due to that.

CITATION LIST

Patent Literature

PTL 1: Japanese Patent No. 4876739

SUMMARY OF INVENTION

Technical Problem

The limit operation rotational amount should be consistent between the left side and the right side to equalize the limit tire steer angle on the left side and the right side. To realize that, the nut should be mounted so as to be located at a neutral position relative to the upper and lower stopper portions in the mechanical stopper mechanism when the steering wheel is located at a neutral position. However, the nut has a front side and a back side, and therefore the neutral position may be displaced when the nut is mounted depending on the direction in which the nut is mounted.

One of the objects of the present invention is to provide a steering operation input apparatus that allows a predetermined neutral position to be acquired regardless of the direction in which the nut is mounted.

Solution to Problem

In a steering operation input apparatus according to one aspect of the present invention, a central position of a movable member in an axial direction overlaps a largest-diameter portion and a smallest-diameter portion of an uneven portion when the movable member is viewed in a cross section along the axial direction with a steering operation input member located at a neutral rotational position. Assuming that a first imaginary line is set so as to extend in a direction perpendicular to the axial direction and pass through the largest-diameter portion and the smallest-diameter portion and a second imaginary line is set so as to extend perpendicularly to the first imaginary line on a line of a rotational axis in a cross section perpendicular to the axial direction at the central position, a restriction unit is symmetric about the first imaginary line and asymmetric about the second imaginary line.

Therefore, the steering operation input apparatus according to the one aspect of the present invention allows the predetermined neutral position to be acquired regardless of the direction in which the nut is mounted.

DESCRIPTION OF EMBODIMENTS

Figure 1:
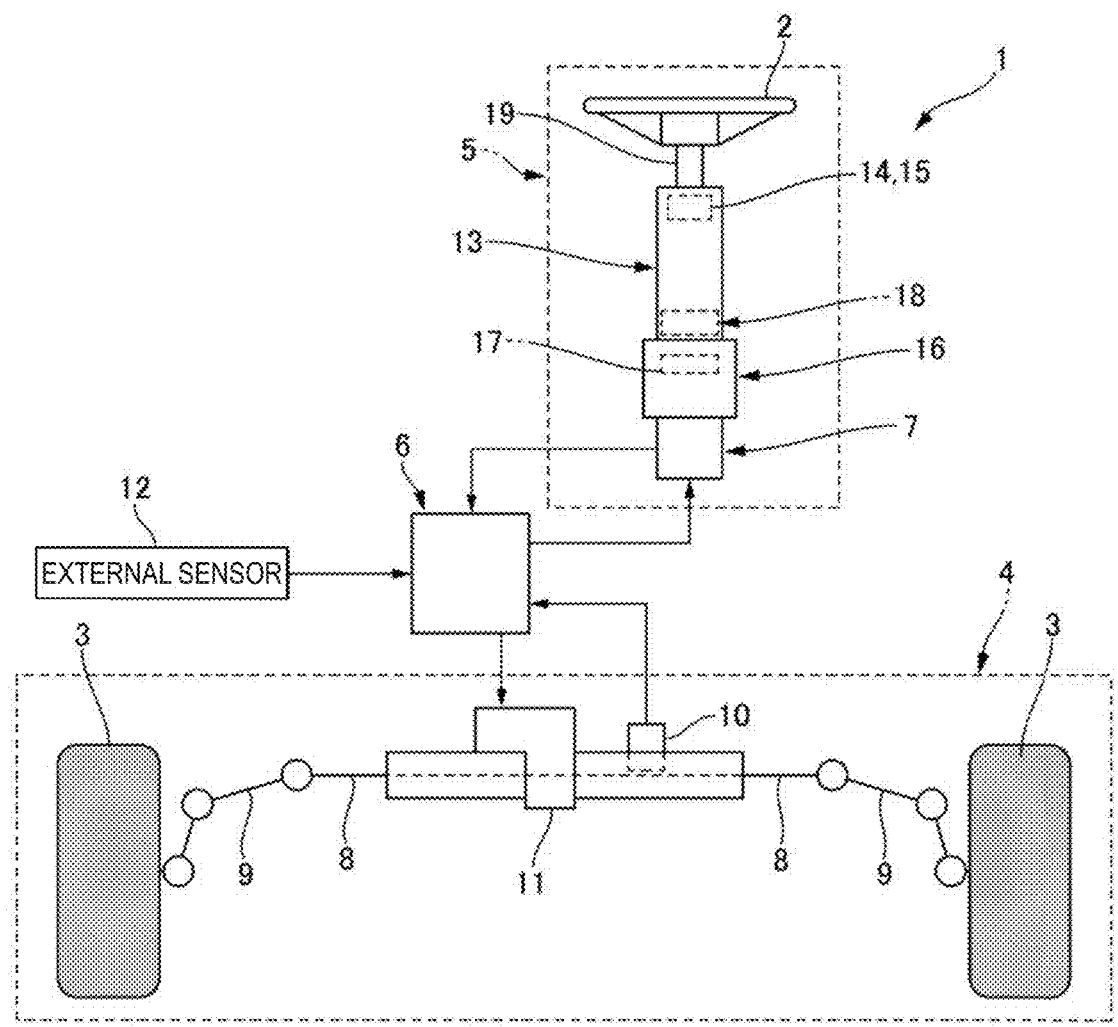
FIG. 1 schematically illustrates a steering apparatus 1 according to a first embodiment.

[First Embodiment] FIG. 1 schematically illustrates a steering apparatus 1 according to a first embodiment.

The steering apparatus 1 is a so-called steer-by-wire steering apparatus, and is mounted on a vehicle. In the steer-by-wire steering apparatus, a steering wheel 2, which is a steering operation input member, and a tire turning device 4 for turning a front wheel 3, which is a wheel to be turned, are mechanically separated from each other. The steering apparatus 1 includes the tire turning device 4, a steering operation input device 5, a tire turning control device 6, and a steering reaction force control device 7.

The tire turning device 4 includes a rack bar 8, a tie rod 9, a rack bar position sensor 10, and a tire turning motor 11. The rack bar 8 is movable in a vehicle width direction, and turns the front wheel 3 according to the movement amount via the tie rod 9. The rack bar position sensor 10 detects the position of the rack bar 8, and outputs a signal according to the detected position to the tire turning control device 6. A tire turning angle of the front wheel 3 is uniquely determined according to the position of the rack bar 8, and therefore the tire turning control device 6 can identify the tire turning angle of the front wheel 3 based on the signal according to the position of the rack bar 8. Further, a signal related to a steering amount of the steering wheel 2 fed via the steering reaction force control device 7 and various detection signals fed from an external sensor 12 including a vehicle speed sensor are input to the tire turning control device 6. The tire turning control device 6 generates a tire turning instruction serving to cause the tire turning angle of the front wheel 3 to match the tire turning angle corresponding to the steering amount of the steering wheel 2, and outputs it to the tire turning motor 11. The tire turning instruction is corrected according to the various kinds of detection signals fed from the external sensor 12. The tire turning motor 11 generates a force for turning the front wheel 3 via the rack bar 8 based on the tire turning instruction fed from the tire turning control device 6.

The steering operation input device 5 includes the steering wheel 2, a column 13, a steering angle sensor 14, a reaction force motor (a reaction force actuator) 16, a motor rotational sensor 17, and a mechanical stopper mechanism 18. The steering wheel 2 is connected to a column shaft (a shaft) 19, and rotates the column shaft 19 according to a driver's operation input. The column 13 rotatably supports the column shaft 19. The steering angle sensor 14 is provided in the column 13, and detects the rotational amount of the column shaft 19 and outputs it to the steering reaction force control device 7. The tire turning angle of the front wheel 3 fed via the tire turning control device 6 and various detection signals fed from the external sensor 12 are input to the steering reaction force control device 7. The steering reaction force control device 7 generates a steering reaction force instruction serving to cause a driver's steering torque estimated based on a current value of the reaction force motor 16 to match a value according to the tire turning angle of the front wheel 3, and outputs it to the reaction force motor 16. The steering reaction force instruction is corrected according to the various kinds of detection signals fed from the external sensor 12. The reaction force motor 16 applies a steering reaction force to the column shaft 19 based on the steering reaction force instruction fed from the steering reaction force control device 7.

Figure 2:
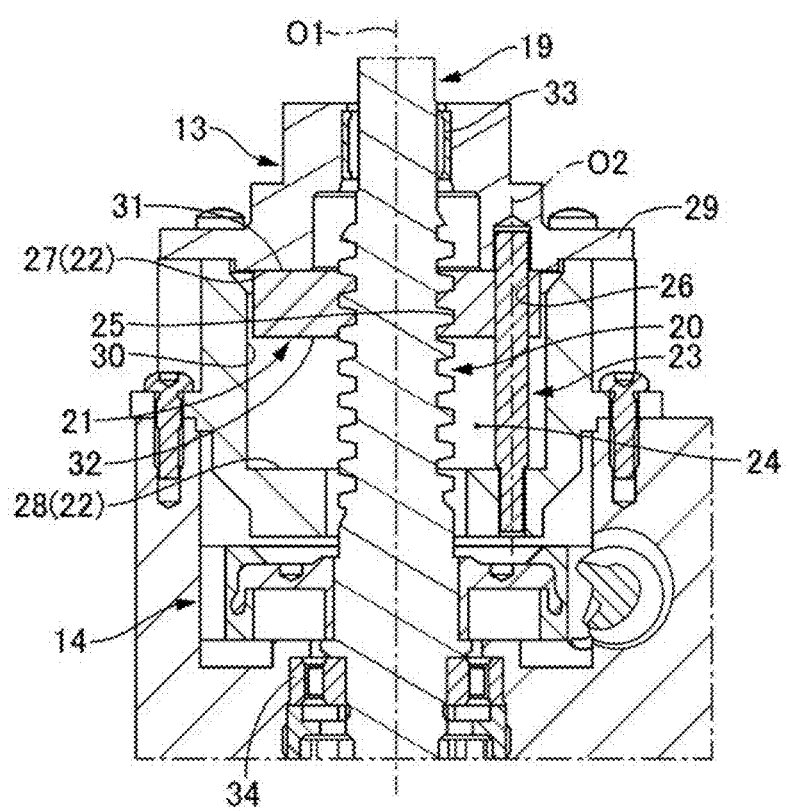
FIG. 2 is an axial cross-sectional view of a column 13, illustrating a mechanical stopper mechanism 18 according to the first embodiment.

The mechanical stopper mechanism 18 is provided in the column 13, and restricts the rotational amount of the column shaft 19 to a predetermined rotational amount (two rotations or so for each of the leftward and rightward directions). FIG. 2 is an axial cross-sectional view of the column 13, illustrating the mechanical stopper mechanism 18 according to the first embodiment.

The mechanical stopper mechanism 18 includes the column shaft 19, an externally threaded portion (an uneven portion) 20, a nut (a movable member) 21, a stopper portion 22, a pin (a restriction unit) 23, and a containing chamber 24. The rotational force is transmitted from the steering wheel 2 to the column shaft 19 as described above. The column shaft 19 rotates in a circumferential direction, assuming that the circumferential direction refers to a direction around a rotational axis O1. The externally threaded portion 20 is formed on the outer peripheral surface of the column shaft 19. The nut 21 is annularly formed as viewed from an axial direction assuming that the axial direction refers to a direction along the rotational axis O1, and is located on the outer peripheral side of the column shaft 19. The nut 21 has no front side and back side. In other words, both end portions 31 and 32 are identically shaped, and no chamfered or R portion is provided at the corner portion thereof. An internally threaded portion (a processed portion) 25, which is engaged (meshed) with the externally threaded portion 20, is formed on the inner peripheral surface of the nut 21. An axially extending through-hole (a restriction unit and a pin relief portion) 26 is formed through the nut 21. The stopper portion 22 includes a pair of wall surfaces (a first stopper portion and a second stopper portion) 27 and 28, which is disposed axially opposite from each other. The first wall surface 27 and the second wall surface 28 are a pair of wall surfaces disposed axially opposite from each other. The first wall surface 27 is located on one axial side of the nut 21 (the upper side of the paper of FIG. 2), and the second wall surface 28 is located on the opposite axial side of the nut 21 (the lower side of the paper of FIG. 2).

The pin 23 extends axially, and is inserted through the through-hole 26. An axis O2 of the pin 23 is parallel with the rotational axis O1. The containing chamber 24 is a generally columnar space provided in a column housing 29 and surrounded by the first wall surface 27, the second wall surface 28, and a side wall 30. The columnar housing 29 is, for example, an aluminum cast member. The containing chamber 24 contains a part of the column shaft 19, the nut 21, the stopper portion 22, and the pin 23. Both axial end portions of the pin 23 are supported by the column housing 29. The pin 23 restricts a circumferential rotation of the nut 21 by abutting against the inner peripheral surface of the through-hole 26, and permits an axial movement of the nut 21. The nut 21 is axially movable in a range between the first wall surface 27 and the second wall surface 28.

FIG. 2 illustrates the nut 21 with the first end portion 31 thereof in abutment with the first wall surface 27. At this time, the steering wheel 2 is in a state of reaching a limit operation rotational amount in the clockwise direction (rotated from the neutral position twice in the clockwise direction). When the steering wheel 2 is rotated from this state in the counterclockwise direction, the nut 21 moves to the opposite axial side until the second end portion 32 is brought into abutment with the second wall surface 28, and the steering wheel 2 reaches a limit operation rotational amount in the counterclockwise direction (rotated twice from the neutral position in the counterclockwise direction) when the second end portion 32 is brought into abutment the second wall surface 28.

The steering angle sensor 14 is disposed on the opposite axial side with respect to the containing chamber 24 in the column housing 29. Further, bearings 33 and 34, which rotatably support the column shaft 19, are disposed on one axial side with respect to the containing chamber 24 and the opposite axial side with respect to the steering angle sensor 14 in the column housing 29, respectively. The not-illustrated reaction force motor 16 is disposed on the opposite axial side with respect to the bearing 34 in the column housing 29.

Figure 3:
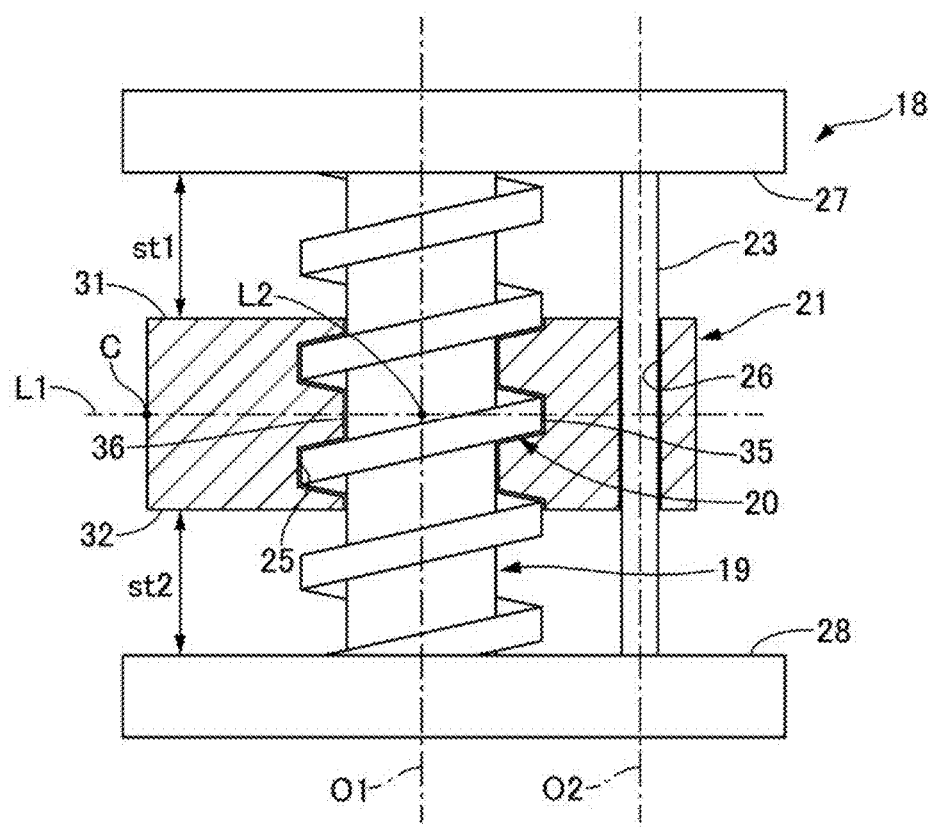
FIG. 3 is a schematic view illustrating the mechanical stopper mechanism 18 according to the first embodiment as viewed from a direction perpendicular to a rotational axis O1.
Figure 4:
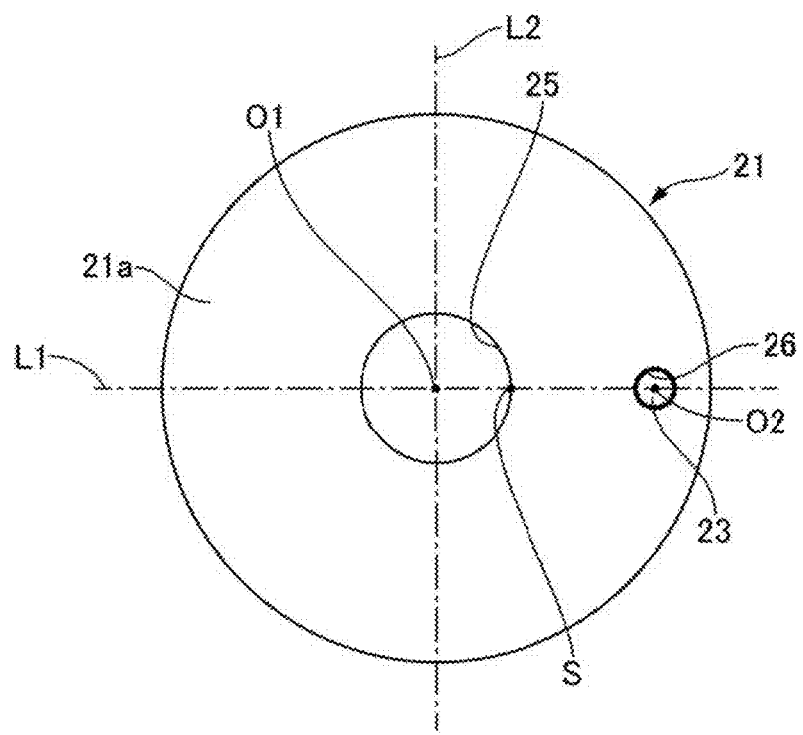
FIG. 4 illustrates a nut 21 according to the first embodiment as viewed from a first wall surface 27 side in a direction along the rotational axis O1.

FIG. 3 is a schematic view illustrating the mechanical stopper mechanism 18 according to the first embodiment as viewed from a direction perpendicular to the rotational axis O1, and FIG. 4 illustrates the nut 21 according to the first embodiment as viewed from the first wall surface 27 side in a direction along the rotational axis O1.

FIG. 3 illustrates the position of the nut 21 when the steering wheel 2 is located at the neutral position. In FIG. 3, the distance from the first end portion 31 of the nut 21 to the first wall surface 27, i.e., a stroke amount st1 of the nut 21 since the steering wheel 2 is located at the neutral position until the steering wheel 2 reaches the limit operation rotational amount in the clockwise direction is equal to the distance from the second end portion 32 of the nut 21 to the second wall surface 28, i.e., a stroke amount st2 of the nut 21 since the steering wheel 2 is located at the neutral position until the steering wheel 2 reaches the limit operation rotational amount in the counterclockwise direction (st1=st2).

An axially central position C of the nut 21 overlaps a crest (a largest-diameter portion) 35 and a root (a smallest-diameter portion) 36 of the externally threaded portion 20 with the steering wheel 2 placed in the neutral state. More specifically, the central position C aligns with the central position of the crest 35 in the direction of the rotational axis O1 and the central position of the root 36 in the direction of the rotational axis O1.

A first imaginary line L1 is set so as to extend in a direction perpendicular to the rotational axis O1 and pass through the crest 35 and the root 36 and a second imaginary line L2 is set so as to extend perpendicularly to the first imaginary line L1 on the line of the rotational axis O1 in a cross section perpendicular to the rotational axis O1 at the central position C of the nut 21. In this case, the pin 23 is symmetric about the first imaginary line L1 and asymmetric about the second imaginary line L2 as illustrated in FIG. 4. The first imaginary line L1 extends through the central position of the pin 23, i.e., extends on the axis O2 of the pin 23.

The nut 21 is subjected to tapping processing in such a manner that a threading start position (a processing start position), which is the start position of the internally threaded portion 25, is consistently located at a position constant relative to the pin 23. For example, in FIG. 4, the threading start position is started from a position of a point S, i.e., a position on the first imaginary line L1 and on a closer side to the pin 23 than the second imaginary line L2 is.

In the containing chamber 24, not-illustrated grease (a lubricant) is held on the surface of the externally threaded portion 20, the surface of the internally threaded portion 25, the first end portion 31 and the second end portion 32 of the nut 21, and the first wall surface 27 and the second wall surface 28.

Next, functions and effects of the first embodiment will be described.

Figure 5:
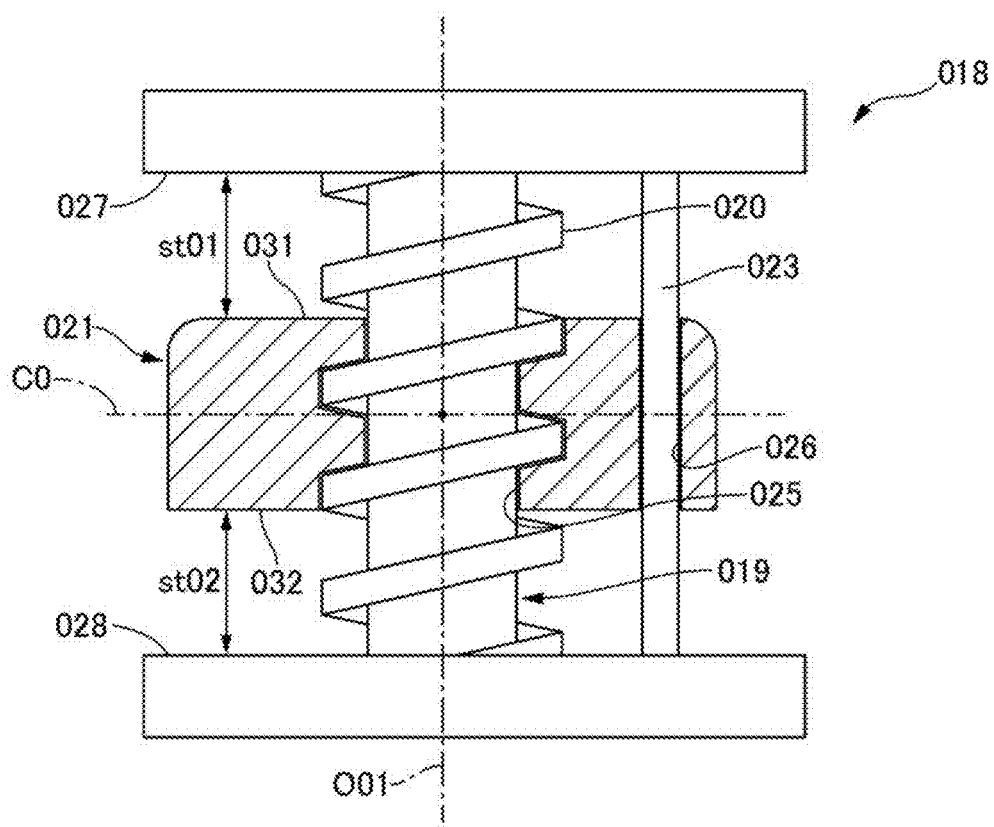
FIG. 5 is a schematic view illustrating a conventional mechanical stopper mechanism 018 as viewed from a direction perpendicular to a rotational axis O01 of a column shaft 019.

FIG. 5 is a schematic view illustrating a conventional mechanical stopper mechanism 018 as viewed from a direction perpendicular to a rotational axis O01 of a column shaft 019.

A nut 021 has a front side and a back side, and is designed in such a manner that a distance st01 between a first wall surface 027 and a front surface 031 is equal to a distance st02 between a second wall surface 028 and a back surface 032 with the front surface 031 facing the first wall surface 027 side and the back surface 032 facing the second wall surface 028 side (mounted forward).

Figure 6:
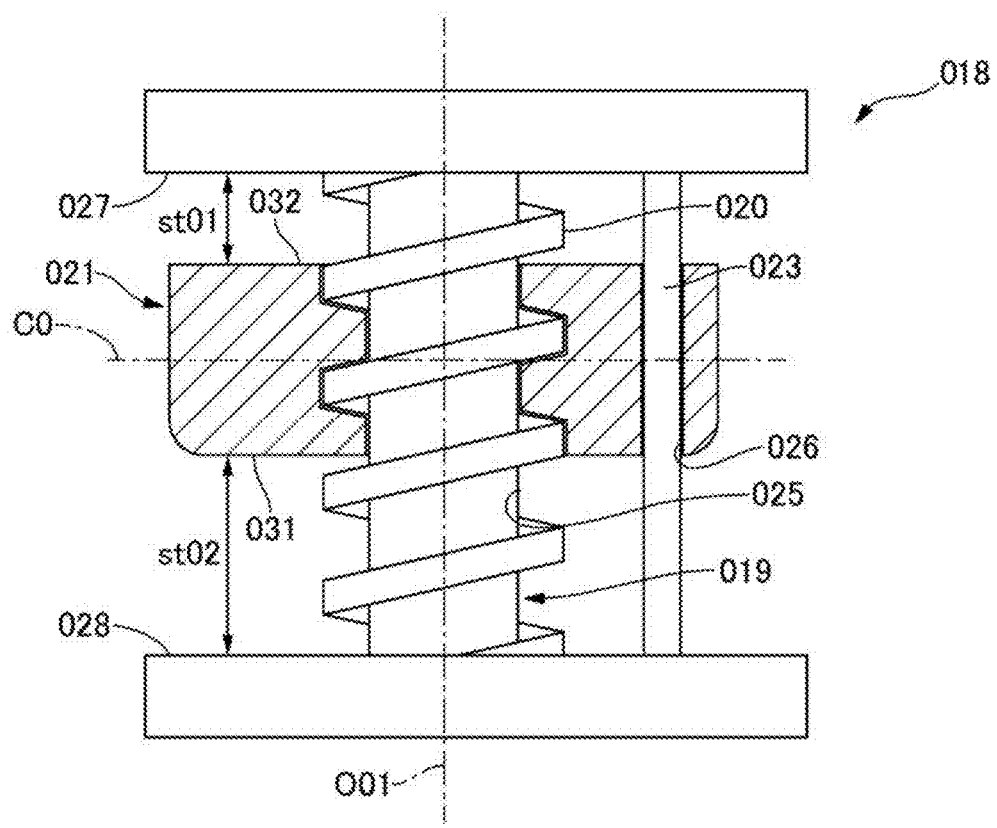
FIG. 6 is a schematic view illustrating the conventional mechanical stopper mechanism 018 with a nut 021 mounted backward.

FIG. 6 illustrates the conventional mechanical stopper mechanism 018 with the nut 021 mounted backward. In the case where the nut 021 has a front side and a back side, if a worker mounts the nut 021 backward, i.e., mounts the nut 021 with the back surface 032 of the nut 021 facing the first wall surface 027 side and the front surface 031 facing the second wall surface 028 side, the internally threaded portion 25 has a rotational phase different from when the nut 021 is mounted forward. Accordingly, when the nut 021 is mounted onto the column shaft 019 with the position of a through-hole 026 placed in alignment with the position of a pin 023, the central position CO of the nut 021 fails to be located at the middle position between the first wall surface 027 and the second wall surface 028, and a difference is generated between the left and right stroke amounts st01 and st02 of the nut 021 (st01≠st02). As a result, the limit tire steer angle is undesirably set to different values on the left side and the right side.

On the other hand, in the mechanical stopper mechanism 18 according to the first embodiment, the axially central position C of the nut 21 aligns with the central position of the crest 35 and the central position of the root 36 of the externally threaded portion 20 with the steering wheel 2 placed in the neutral state, and the pin 23 is symmetric about the first imaginary line L1 and asymmetric about the second imaginary line L2 assuming that the first imaginary line L1 is set so as to extend in the direction perpendicular to the rotational axis O1 and pass through the crest 35 and the root 36 and the second imaginary line L2 is set so as to extend perpendicularly to the first imaginary line L1 on the line of the rotational axis O1 in the cross section perpendicular to the rotational axis O1 at the central position C of the nut 21.

Therefore, even when the worker mounts the nut 21 backward, i.e., mounts the nut 21 onto the column shaft 019 with the first end portion 31 facing the second wall surface 28 side and the second end portion 32 facing the first wall surface 27 side in the direction along the rotational axis O1, the axially central position C of the nut 21 aligns with the central position of the crest 35 and the central position of the root 36, and the pin 23 is positioned symmetrically about the first imaginary line L1 and asymmetrically about the second imaginary line L2. In other words, even when the nut 21 is mounted backward, the rotational phase of the internally threaded portion 25 is kept the same as when the nut 21 is mounted forward. Therefore, the central position C of the nut 21 is located at the middle position between the first wall surface 27 and the second wall surface 28, and the stroke amount of the nut 21 is consistent between the left side st1 and the right side st2 (st1=st2), regardless of whether the nut 21 is mounted frontward or backward. As a result, the mechanical stopper mechanism 18 according to the first embodiment can maintain the predetermined neutral position and acquire the same limit tire steer angle between the left side and the right side regardless of the direction in which the nut 21 is mounted.

Further, the worker does not have to be conscious about which side is the front side or the back side of the nut 21 when mounting the nut 21 onto the column shaft 19, and therefore the assemblability can be improved compared to when the conventional nut having a front side and a back side is used.

On the nut 21, the threading start position of the internally threaded portion 25 is consistently located at the position constant relative to the pin 23. This makes it possible to remove, as a defective component, such a nut that the internally threaded portion 25 has a different threading start position, i.e., such a nut that the internally threaded portion is displaced out of phase and a difference is generated between the left and right stroke amounts st1 and st2 when the nut is mounted backward, thereby contributing to preventing incorrect assembling.

The grease is held in the containing chamber 24. Due to the grease held on the first wall surface 27 and the second wall surface 28, a damping effect can be acquired with the aid of the grease before the nut 21 is brought into abutment with the first wall surface 27 or the second wall surface 28. The mechanical stopper mechanism 18 is mounted for the purpose of functional safety such as preventing a disconnection of an airbag harness at the time of an excessive rotation in which the steering wheel 2 is operated by an operation rotational amount exceeding the normal use range. Therefore, the nut 21 is rarely brought into abutment with the first wall surface 27 or the second wall surface 28 in normal use. Therefore, the damping effect is sufficient even by functioning only once.

The restriction unit for restricting a circumferential rotation of the nut 21 and permitting an axial movement of the nut 21 includes the axially extending pin 23 and the through-hole 26 formed through the nut 21, and the first imaginary line L1 passes through the axis O2 of the pin 23. High component precision can be acquired by using the pin 23 and the through-hole 26 as the restriction unit. Therefore, sliding resistance can be suppressed between the outer peripheral surface of the pin 23 and the inner peripheral surface of the through-hole 26 at the time of steering. This sliding resistance is transmitted to the driver as a reaction force, and therefore the reduction in the sliding resistance allows the steering reaction force control device 7 to control the reaction force with improved controllability.

Further, the number of components can be reduced and the affordability can be increased by using one pin as the pin 23.

Further, forming the pin relief portion using the through-hole 26 through which the pin 23 extends can further ensure the component precision, thereby allowing the steering reaction force control device 7 to control the reaction force with further improved controllability.

[Second Embodiment] A second embodiment has a basic configuration similar to the first embodiment, and therefore will be described focusing only on differences from the first embodiment.

Figure 7:
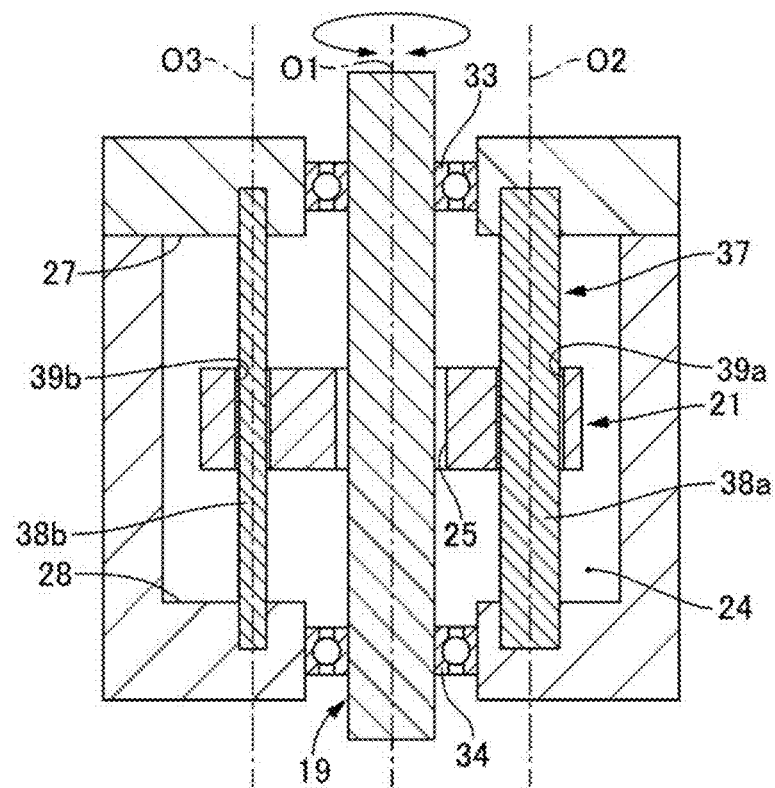
FIG. 7 is a schematic view illustrating a mechanical stopper mechanism 37 according to a second embodiment as viewed from the direction perpendicular to the rotational axis O1.
Figure 8:
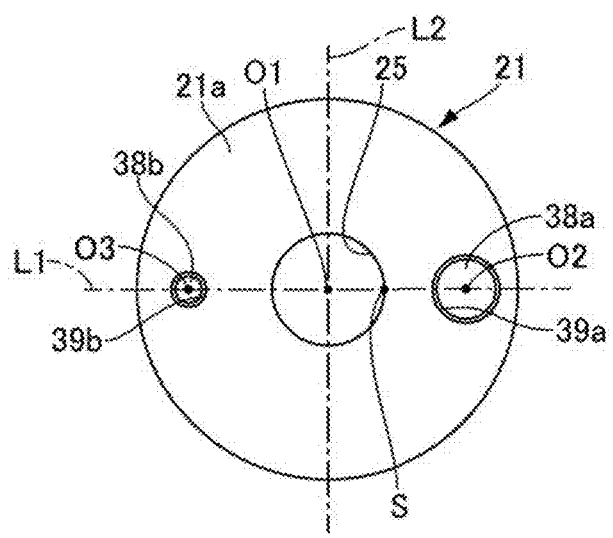
FIG. 8 illustrates the nut 21 according to the second embodiment as viewed from the first wall surface 27 side in the direction along the rotational axis O1.

FIG. 7 is a schematic view illustrating a mechanical stopper mechanism 37 according to the second embodiment as viewed from the direction perpendicular to the rotational axis O1, and FIG. 8 illustrates the nut 21 according to the second embodiment as viewed from the first wall surface 27 side in the direction along the rotational axis O1.

The mechanical stopper mechanism 37 according to the second embodiment includes two pins 38a and 38b and two through-holes 39a and 39b as the restriction unit. The first pin 38a extends through the first through-hole 39a, and the second pin 38b extends through the second through-hole 39b. The first pin 38a is larger than the second through-hole 39b in diameter. Both the axis O2 of the first pin 38a and an axis O3 of the second pin 38b are located on the first imaginary line L1, and are line-symmetric about the second imaginary line L2.

The first embodiment restricts a rotation of the nut 21 using the single pin 23, thereby allowing a backlash of the screw. On the other hand, the second embodiment restricts a rotation of the nut 21 using the plurality of pins 38a and 38b, thereby being able to prevent the nut 21 from tilting and facilitate threading processing compared to when a single pin is used.

Further, in the second embodiment, the two pins 38a and 38b are different from each other in diameter, and the corresponding two through-holes 39a and 39b are also different from each other in diameter. The first pin 38a cannot be inserted through the second through-hole 39b, and therefore the nut 21 can be reliably prevented from being incorrectly mounted on the column shaft 19 with the rotational phase of the internally threaded portion 25 out of phase by 180 degrees.

[Third Embodiment] A third embodiment has a basic configuration similar to the first embodiment, and therefore will be described focusing only on differences from the first embodiment.

Figure 9:
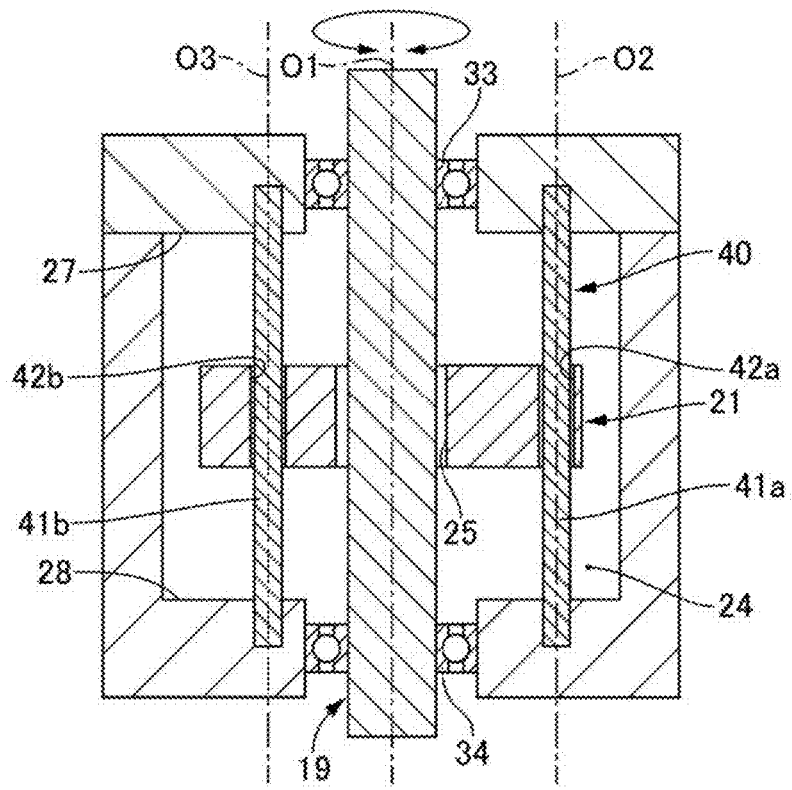
FIG. 9 is a schematic view illustrating a mechanical stopper mechanism 40 according to a third embodiment as viewed from the direction perpendicular to the rotational axis O1.
Figure 10:
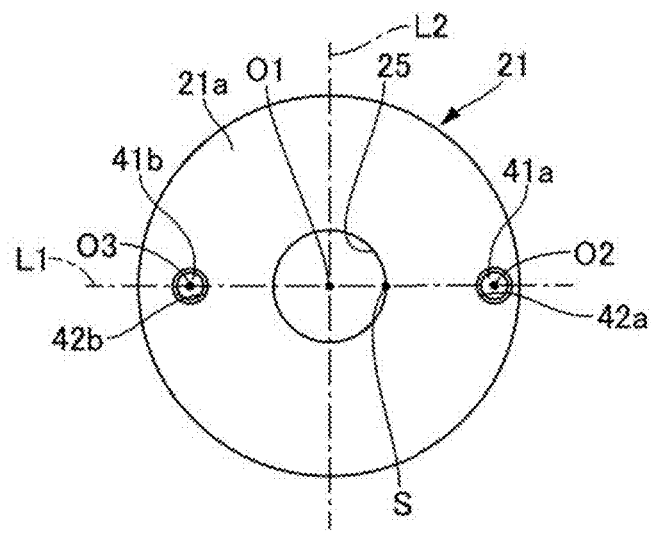
FIG. 10 illustrates the nut 21 according to the third embodiment as viewed from the first wall surface 27 side in the direction along the rotational axis O1.

FIG. 9 is a schematic view illustrating a mechanical stopper mechanism 40 according to the third embodiment as viewed from the direction perpendicular to the rotational axis O1, and FIG. 10 illustrates the nut 21 according to the third embodiment as viewed from the first wall surface 27 side in the direction along the rotational axis O1.

The mechanical stopper mechanism 40 according to the third embodiment includes two pins 41a and 41b and two through-holes 42a and 42b as the restriction unit. The first pin 41a extends through the first through-hole 42a, and the second pin 41b extends through the second through-hole 42b. The first pin 41a and the second pin 41b are equal to each other in diameter. Further, the first through-hole 42a and the second through-hole 42b are also equal to each other in diameter. Both the axis O2 of the first pin 41a and the axis O3 of the second pin 41b are located on the first imaginary line L1. Assuming that a radial direction refers to a radial direction around the rotational axis O1, the axial O2 of the first pin 41a is located outside the axis O3 of the second pin 41b in the radial direction.

The third embodiment uses the identically shaped two pins 41a and 41b, thereby being able to reduce the manufacturing cost due to the commonality of parts.

Further, in the third embodiment, the first through-hole 42a and the second through-hole 42b are located at radial positions different from each other, and therefore the nut 21 can be reliably prevented from being incorrectly mounted onto the column shaft 19 with the rotational phase of the internally threaded portion 25 out of phase by 180 degrees.

[Fourth Embodiment] A fourth embodiment has a basic configuration similar to the first embodiment, and therefore will be described focusing only on differences from the first embodiment.

Figure 11:
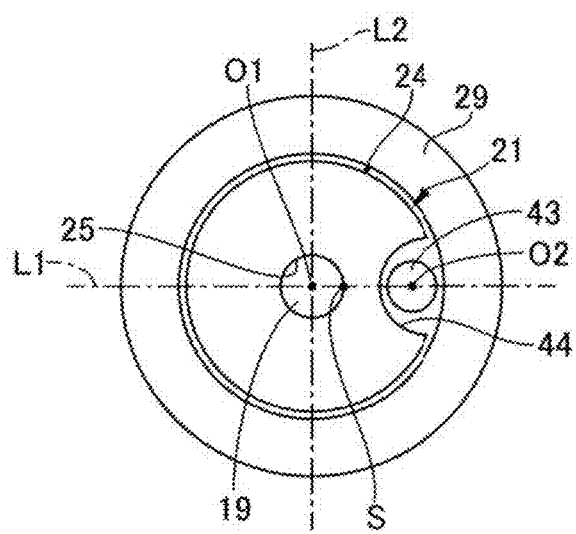
FIG. 11 illustrates the nut 21 according to a fourth embodiment as viewed from the first wall surface 27 side in the direction along the rotational axis O1.

FIG. 11 illustrates the nut 21 according to the fourth embodiment as viewed from the first wall surface 27 side in the direction along the rotational axis O1.

The fourth embodiment includes a pin 43 and a cutout (the pin relief portion) 44 as the restriction unit. The pin 43 extends axially, and is parallel with the rotational axis O1. The cutout 44 is a recessed portion formed on the circumferential edge of the nut 21, and the end surface thereof is formed into a generally circular-arc shape as viewed from the axial direction. The radius of the circular arc is larger than the radius of the pin 43. The pin 43 restricts a circumferential rotation of the nut 21 by abutting against the circumferential edge of the cutout 44.

The fourth embodiment uses the cutout 44 as the pin relief portion, thereby allowing the cutout 44 to be forged when the nut 21 is processed. Further, the fourth embodiment does not require a process for forming the cutout 44 additionally after processing the nut 21, thereby being able to reduce the processing cost compared to when a through-hole is used as the pin relief portion.

[Fifth Embodiment] A fifth embodiment has a basic configuration similar to the fourth embodiment, and therefore will be described focusing only on differences from the fourth embodiment.

Figure 12:
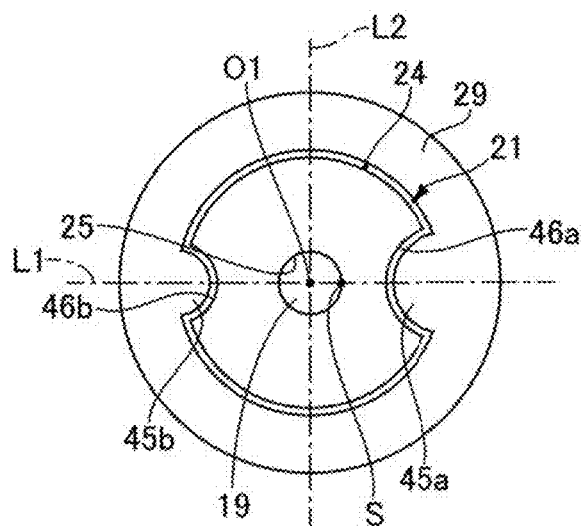
FIG. 12 illustrates the nut 21 according to a fifth embodiment as viewed from the first wall surface 27 side in the direction along the rotational axis O1.

FIG. 12 illustrates the nut 21 according to the fifth embodiment as viewed from the first wall surface 27 side in the direction along the rotational axis O1.

The fifth embodiment includes two protrusions 45a and 45b and two cutouts 46a and 46b as the restriction unit. The two protrusions 45a and 45b protrude from the inner peripheral surface of the column housing 29 toward the rotational axis O1, and extend axially. The tips of the two protrusions 45a and 45b are each formed into a generally circular-arc shape as viewed from the axial direction. The two protrusions 45a and 45b are disposed at positions opposite of the second imaginary line L2 from each other. The two cutouts 46a and 46b are recessed portions formed on the circumferential edge of the nut 21, and the first cutout 46a and the second cutout 46b correspond to the first protrusion 45a and the second protrusion 45b, respectively.

The fifth embodiment includes the restriction unit partially formed on the column housing 29, thereby being able to reduce the number of components compared to when a component such as a pin is added separately. Further, because the two protrusions 45a and 45b can be formed when the column housing 29 is cast, the processing cost can be reduced compared to when a pin is used.

[Sixth Embodiment] A sixth embodiment has a basic configuration similar to the fourth embodiment, and therefore will be described focusing only on differences from the fourth embodiment.

Figure 13:
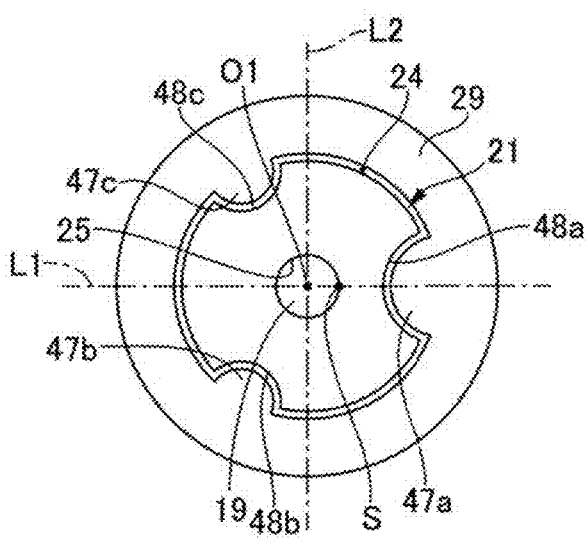
FIG. 13 illustrates the nut 21 according to a sixth embodiment as viewed from the first wall surface 27 side in the direction along the rotational axis O1.

FIG. 13 illustrates the nut 21 according to the sixth embodiment as viewed from the first wall surface 27 side in the direction along the rotational axis O1.

The sixth embodiment includes three protrusions 47a, 47b, and 47c and three cutouts 48a, 48b, and 48c as the restriction unit. The center of the first protrusion 47a is located on the first imaginary line L1 circumferentially. Circumferentially, the second protrusion 47b is disposed at a position 120 degrees away from the first protrusion 47a in the counterclockwise direction, and the third protrusion 47c is disposed at a position 120 degrees away from the first protrusion 47a in the clockwise direction. The second protrusion 47b and the third protrusion 47c are line-symmetric about the second imaginary line L2. The three cutouts 48a to 48c are recessed portions formed on the circumferential edge of the nut 21, and the first cutout 48a, the second cutout 48b, and the third cutout 48c correspond to the first protrusion 47a, the second protrusion 47b, and the third protrusion 47c, respectively.

The sixth embodiment restricts a rotation of the nut 21 using the three protrusions 47a to 47c, thereby being able to prevent the nut 21 from tilting and facilitate the threading processing compared to when a single protrusion or two protrusions is/are used.

[Seventh Embodiment] A seventh embodiment has a basic configuration similar to the fourth embodiment, and therefore will be described focusing only on differences from the fourth embodiment.

Figure 14:
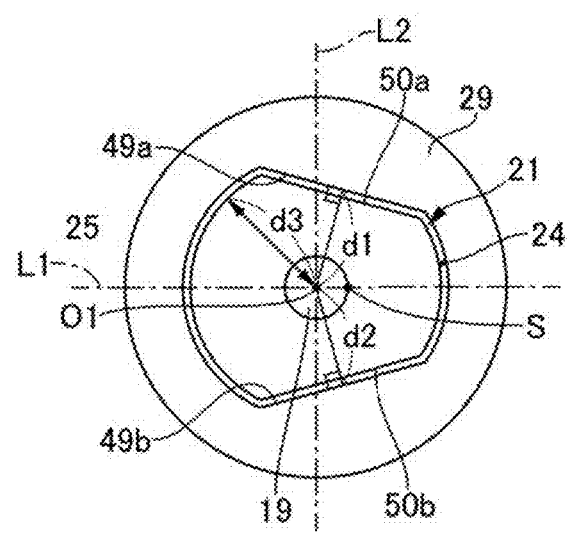
FIG. 14 illustrates the nut 21 according to a seventh embodiment as viewed from the first wall surface 27 side in the direction along the rotational axis O1.

FIG. 14 illustrates the nut 21 according to the seventh embodiment as viewed from the first wall surface 27 side in the direction along the rotational axis O1.

The seventh embodiment includes two restriction surfaces 49a and 49b and two flat surface portions 50a and 50b as the restriction unit. The two restriction surfaces 49a and 49b are formed on the inner peripheral surface of the column housing 29, and shortest distances d1 and d2 (d1=d2) from the rotational axis O1 to the abutment surfaces 49a and 49b are shorter than an outermost diameter d3 of the nut 21. The two restriction surfaces 49a and 49b are line-symmetric about the first imaginary line L1. The two flat surface portions 50a and 50b are formed on the circumferential edge of the nut 21. A circumferential rotation of the nut 21 is restricted due to the abutment of the first flat surface portion 50a with the first restriction surface 49a or the abutment of the second flat surface portion 50b with the second restriction surface 49b.

The seventh embodiment restricts a rotation of the nut 21 using the two restriction surfaces 49a and 49b formed on the columnar housing 29, thereby being advantageous from the perspective of durability compared to when a pin or protrusion is used.

[Other Embodiments] Having described the embodiments for implementing the present invention, the specific configuration of the present invention is not limited to the configurations of the embodiments, and the present invention also includes even a design modification and the like thereof made within a range that does not depart from the spirit of the present invention, if any.

The spiral uneven portion formed on the outer peripheral surface of the shaft may be a ball screw.

The embodiments have been described referring to the example in which the central position of the movable member axially aligns with the central position of the largest-diameter portion and the central position of the smallest-diameter portion, but a predetermined central position can be acquired as the central position of the movable member regardless of the direction in which the movable member is mounted as long as this central position overlaps the largest-diameter portion and the smallest-diameter portion. The overlap range is a tolerance, and falls within, for example, a range of the diameter of the pin 23 in the case of the first embodiment.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2022-020455 filed on Feb. 14, 2022. The entire disclosure of Japanese Patent Application No. 2022-020455 filed on Feb. 14, 2022 including the specification, the claims, the drawings, and the abstract is incorporated herein by reference in its entirety.

REFERENCE SIGNS LIST

C central position
O1 rotational axis
L1 first imaginary line
L2 second imaginary line
1 steering apparatus
2 steering wheel (steering operation input member)
16 reaction force motor (reaction force actuator)
18 mechanical stopper mechanism 19 column shaft (shaft)
20 externally threaded portion (uneven portion)
21 nut (movable member)
22 stopper portion
23 pin (restriction unit)
26 through-hole (restriction unit and pin relief portion)
27 first wall surface (first stopper portion)
28 second wall surface (second stopper portion)
35 crest (largest-diameter portion)
36 root (smallest-diameter portion)

The invention claimed is:

1. A steering operation input apparatus comprising:
a steering operation input member mounted on a vehicle;
a reaction force actuator configured to provide a steering reaction force to the steering operation input member; and
a mechanical stopper mechanism configured to restrict an operation rotational amount of the steering operation input member,
the mechanical stopper mechanism including
a shaft configured to rotate in a circumferential direction of a rotational axis according to transmission of a rotational force from the steering operation input member thereto,
a spiral uneven portion formed on an outer peripheral surface of the shaft,
a movable member configured to be engaged with the uneven portion, the movable member being movable in an axial direction according to a rotational operation performed on the steering operation input member assuming that the axial direction is a direction along the rotational axis,
a stopper portion including a first stopper portion and a second stopper portion, the movable member having a first end portion and a second end portion that are both end portions thereof in the axial direction, the first end portion and the second end portion being brought into abutment with the first stopper portion and the second stopper portion, respectively, when the movable member moves in the axial direction, and
a restriction unit configured to restrict a rotation of the movable member in the circumferential direction and permit a movement of the movable member in the axial direction,
wherein the uneven portion has a largest-diameter portion and a smallest-diameter portion configured to be engaged with the movable member when the shaft is viewed in a cross section perpendicular to the axial direction,
wherein a central position of the movable member in the axial direction overlaps the largest-diameter portion and the smallest-diameter portion of the uneven portion when the movable member is viewed in a cross section along the axial direction with the steering operation input member located at a neutral rotational position, and
wherein, assuming that a first imaginary line is set so as to extend in a direction perpendicular to the axial direction and pass through the largest-diameter portion and the smallest-diameter portion and a second imaginary line is set so as to extend perpendicularly to the first imaginary line on a line of the rotational axis in a cross section perpendicular to the axial direction at the central position,
the restriction unit is symmetric about the first imaginary line and asymmetric about the second imaginary line.

2. The steering operation input apparatus according to claim 1, wherein the central position aligns with a central position of the largest-diameter portion in the axial direction and a central position of the smallest-diameter portion in the axial direction.

3. The steering operation input apparatus according to claim 2, wherein, on the movable member, a processing start position of a processed portion, which is processed to be engaged with the uneven portion, is started from a position constant relative to the restriction unit when the movable member is viewed from the axial direction.

4. The steering operation input apparatus according to claim 3, wherein the mechanical stopper mechanism includes a containing chamber that contains a part of the shaft, the movable member, the stopper portion, and the restriction unit, and
wherein a lubricant is held in the containing chamber.

5. The steering operation input apparatus according to claim 1, wherein the restriction unit includes a pin extending in the axial direction, and a pin relief portion formed on the movable member, and
wherein the first imaginary line passes through an axis of the pin.

6. The steering operation input apparatus according to claim 5, wherein the pin includes a single pin.

7. The steering operation input apparatus according to claim 6, wherein the pin relief portion is a through-hole through which the pin extends.

8. The steering operation input apparatus according to claim 6, wherein the pin relief portion is a cutout.

9. The steering operation input apparatus according to claim 5, wherein the pin includes a plurality of pins.

10. The steering operation input apparatus according to claim 9, wherein each of the plurality of pins is identically shaped.

11. The steering operation input apparatus according to claim 9, wherein each of the plurality of pins is differently shaped.

12. The steering operation input apparatus according to claim 1, wherein the mechanical stopper mechanism includes a containing chamber that contains a part of the shaft, the movable member, the stopper portion, and the restriction unit,
wherein the restriction unit includes a first restriction unit and a second restriction unit, the first restriction unit including a protrusion provided on a wall portion in the containing chamber, protruding toward the shaft, and extending in the axial direction, the second restriction unit serving as a relief for the first restriction unit formed on the movable member, and
wherein the first imaginary line passes through a central position of the first restriction unit when the shaft is viewed from the axial direction.

* * * * *